United States Patent
Kunz et al.

(10) Patent No.: US 8,972,298 B2
(45) Date of Patent: Mar. 3, 2015

(54) MERCHANT CATEGORY CODES IN A PROXY CARD TRANSACTION

(71) Applicant: Google Inc., Mountain View, CA (US)

(72) Inventors: William Dennis Kunz, Mountain View, CA (US); Mark William Andrews, San Francisco, CA (US); Christopher Michael Petersen, New Canaan, CT (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/168,887

(22) Filed: Jan. 30, 2014

(65) Prior Publication Data

US 2014/0149292 A1 May 29, 2014

Related U.S. Application Data

(63) Continuation of application No. 13/717,295, filed on Dec. 17, 2012, now Pat. No. 8,676,709.

(60) Provisional application No. 61/678,089, filed on Jul. 31, 2012.

(51) Int. Cl.
| | |
|---|---|
| *G06K 5/00* | (2006.01) |
| *G06Q 20/00* | (2012.01) |
| *G06Q 30/00* | (2012.01) |
| *G06Q 40/00* | (2012.01) |
| *G06Q 20/10* | (2012.01) |
| *G06Q 20/36* | (2012.01) |
| *G06Q 20/40* | (2012.01) |
| *G06Q 20/34* | (2012.01) |

(52) U.S. Cl.
CPC .............. *G06Q 20/105* (2013.01); *G06Q 20/36* (2013.01); *G06Q 40/00* (2013.01); *G06Q 20/00* (2013.01); *G06K 5/00* (2013.01); *G06Q 30/00* (2013.01); *G06Q 20/40* (2013.01); *G06Q 20/405* (2013.01); *G06Q 20/351* (2013.01); *G06Q 20/3674* (2013.01)
USPC ....... 705/44; 235/380; 705/14.17; 705/14.23; 705/14.65; 705/39; 705/41; 705/75; 705/30

(58) Field of Classification Search
None
See application file for complete search history.

(56) References Cited

U.S. PATENT DOCUMENTS

| | | | | | |
|---|---|---|---|---|---|
| 5,621,201 | A | * | 4/1997 | Langhans et al. | ............. 235/380 |
| 6,819,270 | B1 | * | 11/2004 | Cales et al. | ..................... 341/50 |
| 7,650,314 | B1 | * | 1/2010 | Saunders | ........................ 705/64 |

(Continued)

*Primary Examiner* — Gregory Johnson
(74) *Attorney, Agent, or Firm* — Johnson, Marcou & Isaacs, LLC

(57) ABSTRACT

Transmitting category codes to payment instruments in proxy card transactions comprises receiving a first payment request to authorize a proxy card transaction, the first payment request identifying a proxy account of a user for payment of the transaction and a merchant category code associated with the merchant; selecting a financial account associated with the proxy account to fund the transaction; communicating a second payment request to authorize the transaction to a financial account system associated with the selected financial account, the second payment request comprising the merchant category code associated with the merchant; receiving an authorization for the transaction from the financial account system to fund the transaction using the selected financial account; and communicating an authorization for the transaction to the merchant computing device in response to receiving the authorization for the transaction from the financial account system to fund the transaction using the selected financial account.

9 Claims, 5 Drawing Sheets

(56) References Cited

U.S. PATENT DOCUMENTS

| | | | |
|---|---|---|---|
| 7,783,501 B2* | 8/2010 | Slen et al. | 705/2 |
| 7,996,288 B1* | 8/2011 | Stolfo | 705/35 |
| 8,676,709 B2* | 3/2014 | Kunz et al. | 705/44 |
| 2002/0091646 A1* | 7/2002 | Lake et al. | 705/67 |
| 2003/0018567 A1* | 1/2003 | Flitcroft et al. | 705/37 |
| 2003/0126094 A1* | 7/2003 | Fisher et al. | 705/75 |
| 2004/0210531 A1* | 10/2004 | Barron et al. | 705/44 |
| 2004/0249745 A1* | 12/2004 | Van Baaren | 705/39 |
| 2004/0254848 A1* | 12/2004 | Golan et al. | 705/26 |
| 2006/0092953 A1* | 5/2006 | Haverinen et al. | 370/400 |
| 2007/0192245 A1* | 8/2007 | Fisher et al. | 705/39 |
| 2008/0015988 A1* | 1/2008 | Brown et al. | 705/44 |
| 2008/0156868 A1* | 7/2008 | Slen et al. | 235/380 |
| 2009/0043702 A1* | 2/2009 | Bennett | 705/41 |
| 2009/0063355 A1* | 3/2009 | Antoo et al. | 705/78 |
| 2009/0192904 A1* | 7/2009 | Patterson et al. | 705/17 |
| 2010/0030698 A1* | 2/2010 | Goodin | 705/76 |
| 2010/0114713 A1* | 5/2010 | Anderson | 705/14.69 |
| 2010/0138324 A1* | 6/2010 | Allen | 705/30 |
| 2010/0211445 A1* | 8/2010 | Bodington | 705/14.17 |
| 2010/0288834 A1* | 11/2010 | Tichelaer et al. | 235/380 |
| 2011/0077976 A1* | 3/2011 | Kohl | 705/4 |
| 2011/0078042 A1* | 3/2011 | Fletcher | 705/26.35 |
| 2011/0087547 A1* | 4/2011 | Amaro et al. | 705/14.53 |
| 2011/0180598 A1* | 7/2011 | Morgan et al. | 235/380 |
| 2011/0208656 A1* | 8/2011 | Alba et al. | 705/65 |
| 2011/0246317 A1* | 10/2011 | Coppinger | 705/17 |
| 2011/0302079 A1* | 12/2011 | Neuhaus | 705/39 |
| 2012/0066126 A1* | 3/2012 | Kingston et al. | 705/44 |
| 2012/0095819 A1* | 4/2012 | Li | 705/14.23 |
| 2012/0197773 A1* | 8/2012 | Grigg et al. | 705/35 |
| 2012/0239474 A1* | 9/2012 | Healy et al. | 705/14.17 |
| 2012/0253852 A1* | 10/2012 | Pourfallah et al. | 705/4 |
| 2012/0284105 A1* | 11/2012 | Li | 705/14.23 |
| 2012/0290482 A1* | 11/2012 | Atef et al. | 705/44 |
| 2012/0330831 A2* | 12/2012 | Ross et al. | 705/44 |
| 2013/0024289 A1* | 1/2013 | Cueli et al. | 705/14.65 |
| 2013/0024371 A1* | 1/2013 | Hariramani et al. | 705/41 |
| 2013/0024372 A1* | 1/2013 | Spodak et al. | 705/41 |
| 2013/0036048 A1* | 2/2013 | Campos et al. | 705/41 |

* cited by examiner

MERCHANT CATEGORY CODES IN A PROXY CARD TRANSACTION

This application is a continuation of U.S. patent application Ser. No. 13/717,295 filed Dec. 17, 2012 and entitled "Merchant Category Codes In A Proxy Card Transaction," which claims priority under 35 U.S.C. §119 to U.S. patent application Ser. No. 61/678,089 filed Jul. 31, 2012 and entitled "Proxy Card System." The entire contents of the above-identified applications are hereby fully incorporated herein by reference.

TECHNICAL FIELD

The present disclosure relates generally to proxy card transactions, and more particularly to transmitting merchant category codes to a payment instrument system.

BACKGROUND

In a conventional merchant-consumer financial transaction, the merchant's point of sale terminal or online payment process engine submits a payment request to an acquirer for payment for the transaction. The acquirer then submits the request to authorize the transaction to an issuer through a card network. If funds are available, the issuer sends an authorization code to the acquirer through the card network, and the acquirer notifies the merchant of the approval for the payment transaction. The payment process involves a single payment request generated and submitted by the merchant. The request contains generalized information, such as the total payment amount and consumer account-identifying information encoded on the card's magnetic stripe or user-entered information, but the request does not contain item-specific information, such as the stock-keeping unit ("SKU") number, or user identification information, such as an electronic mail address.

Conventional merchant-consumer financial transactions also have involved payment via a consumer's financial account, such as a debit card, credit card, or stored value card. The consumer card typically accesses only one type of account, which is maintained by only one issuer. For instance, an "issuer1" credit card accesses only the consumer's financial account from "issuer1," and payment is approved/denied by a single issuer ("issuer1"). Approval or denial of the transaction is dependent upon rules set by the particular issuer, for example, credit limits and geographical limitations. Notification of a violation of these rules results in a declined transaction, and the consumer must contact the issuer to alter the rules or to address a declined transaction.

More recently, proxy card payment systems enable users to utilize a single card to access multiple financial accounts maintained by multiple issuers. The merchant supplies a merchant category code ("MCC") or an alternate category code to a payment instrument to the proxy card payment system, but the MCC is not further transmitted to the payment instrument system that is selected to conduct the transaction because the proxy card system is not a merchant and does not have a merchant category code to insert into the new payment request. That is, when the proxy card system receives the transaction request details and the MCC, determines the payment instrument to be utilized, and requests a second transaction with the selected payment instrument, the proxy card system does not transmit the MCC to the payment instrument system. Thus, the payment instrument system cannot use the MCC for characterizing the transaction.

SUMMARY

One aspect of the example embodiments described herein provides a computer-implemented method to transmit merchant category codes to a payment instrument in a proxy transaction. A payment system employs a server configured for receiving, using one or more computing devices and from a merchant computing device associated with a merchant, a first payment request to authorize a proxy card transaction, the first payment request identifying a proxy account of a user for payment of the transaction and a merchant category code associated with the merchant; selecting a financial account associated with the proxy account to fund the transaction; communicating a second payment request to authorize the transaction to a financial account system associated with the selected financial account, the second payment request comprising the merchant category code associated with the merchant; receiving an authorization for the transaction from the financial account system to fund the transaction using the selected financial account; and communicating an authorization for the transaction to the merchant computing device in response to receiving the authorization for the transaction from the financial account system to fund the transaction using the selected financial account.

Another aspect of the example embodiments described herein provides a computer program product that is installed on a server to transmit merchant category codes to a payment instrument in a proxy transaction. The computer program product includes a non-transitory computer-readable storage device having computer-readable program instructions stored therein. The computer-readable program instructions include computer program instructions to receive a first payment request to authorize a proxy card transaction, the first payment request identifying a proxy account of a user for payment of the transaction and a merchant category code associated with the merchant; select a financial account associated with the proxy account to fund the transaction; determine that the financial account system does not accept the merchant category code provided in the first payment request; convert the merchant category code to an alternate category code in response a determination that the financial account system does not accept the merchant category code provided in the first payment request, the alternate category being associated with an alternate category code system utilized by the financial account system; communicate a second payment request to authorize the transaction to a financial account system associated with the selected financial account, the second payment request comprising the merchant category code associated with the merchant; receiving an authorization for the transaction from the financial account system to fund the transaction using the selected financial account; and communicating an authorization for the transaction to the merchant computing device in response to receiving the authorization for the transaction from the financial account system to fund the transaction using the selected financial account.

These and other aspects, objects, features and advantages of the example embodiments will become apparent to those having ordinary skill in the art upon consideration of the following detailed description of illustrated example embodiments, which include the best mode of carrying out the invention as presently presented.

DETAILED DESCRIPTION OF THE EXAMPLE EMBODIMENTS

Overview

Figure 1:
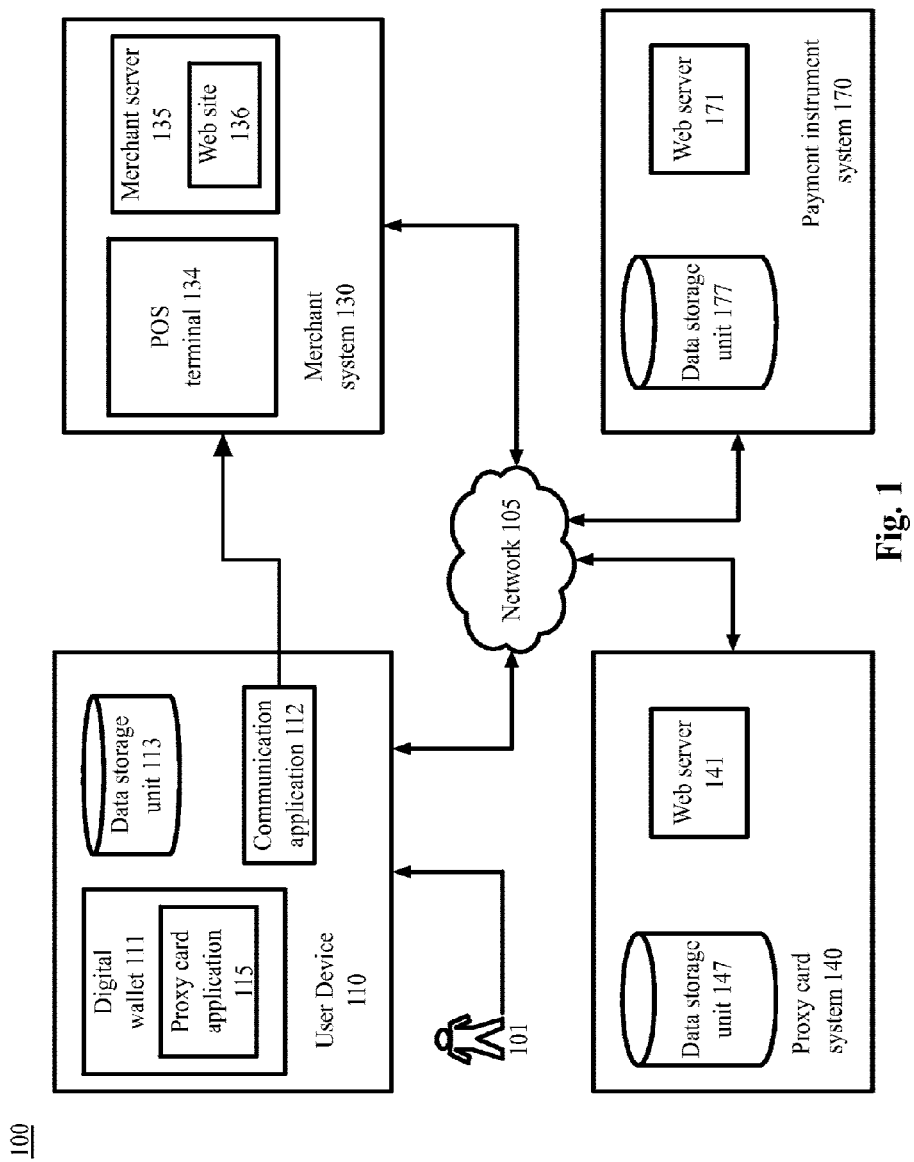
FIG. 1 is a block diagram depicting a system for transmitting merchant category codes to a payment instrument, in accordance with certain example embodiments.

In the example embodiment, proxy card payment systems enable users to utilize a single card to access multiple financial accounts maintained by multiple issuers. The user receives a proxy card from the proxy card system and either creates a new proxy card system account or associates the proxy card with the user's digital wallet account already maintained by the proxy card system. The user then associates one or more financial card accounts with the proxy account. For example, the user can associate with the user's proxy card account multiple debit/credit cards maintained by multiple issuers (including the proxy card system operating as an issuer), stored value cards (for example, gift cards, prepaid cards, re-loadable transaction cards, exchange cards, and other forms of non-credit based value cards), loyalty cards or store rewards cards, value added service accounts (for example, coupons, vouchers for prepaid offers, redemption offers, and other forms of offers), peer-to-peer transaction accounts, bank accounts and/or other forms of financial card accounts. The user applies the proxy card to a transaction with the merchant in a manner similar to the application of any financial card to a transaction. The merchant forwards the payment request to the acquirer, which forwards the payment request to the card network. The card network forwards the proxy card payment request to the proxy card system, which functions as the issuer for the payment request. The proxy card system can read proxy card account information from the payment request and can access the user's account associated with the proxy card. If the proxy card system is the issuer of the financial account, the proxy card system will approve or decline the transaction. If another issuer maintains the financial account to be used for the transaction, the proxy card system will generate and send a new payment request to that issuer via the card network. The proxy card system will receive the authorization message from the issuer via the card network if the transaction is approved. The proxy card system forwards an authorization to the acquirer through the card network, which forwards the authorization to the merchant. The merchant then approves the transaction.

The user can then add, delete, or change the default payment rules associated with the proxy card. The user can change these default static rules, create new rules, or delete a rule. In an example embodiment, the user can access the proxy card system account and modify the rules at any time, including a time immediately before a payment transaction is initiated using the proxy card. In an example embodiment, the user can access the proxy card system account using an application operating on a mobile device or other device equipped with a web browser and connected to the Internet.

In a conventional payment instrument transaction, the merchant supplies the merchant category code ("MCC") or an alternate category code to a payment instrument. The payment instrument can use the MCC to assist in characterizing the transaction. For example, the payment instrument system can use the MCC to determine the rewards level of the transaction. In another example, the payment instrument system can use the MCC to provide users with feedback regarding the types of goods/services purchased. In another example, the payment instrument system can use the MCC to provide a spending analysis for a user.

Under traditional proxy card systems, the issuer of the payment instrument designated by the user as the backing instrument does not receive an MCC or other category code with the payment request. As described above, the merchant system sends an initial proxy card payment request to the proxy card issuer. The initial proxy card payment request contains the MCC or category code for the merchant system. However, a second payment request is created by the proxy card system and forwarded to the payment instrument system that issued the payment instrument designated by the user as the backing instrument. Since the second payment request differs from the initial proxy card payment request and originates from the proxy card system, the MCC or category code is not included in the second payment request.

In an example embodiment, when User A requests to make a purchase using her proxy card account, the merchant system transmits a proxy card payment request to the proxy card system. The merchant system generates the proxy card payment request and inserts the MCC and a merchant system identifier into the proxy card payment request. The proxy card system receives the proxy card payment request from the merchant system and identifies the MCC. The proxy card system determines that User A designated her credit card issued by Bank X as the payment instrument account to process the transaction since she receives reward points from Bank X for every purchase at the merchant system. The proxy card system generates a second payment request to Bank X for the transaction amount requested in the proxy card payment request. The proxy card system then inserts the MCC from the proxy card payment request into the second request before transmitting the second payment request to Bank X. Bank X receives the second payment request and authorizes the transaction. Bank X reads the MCC from the second payment request and provides User A with her reward points or other characterization for her transaction with the merchant system.

In an alternative example embodiment, the proxy card system will maintain a database of merchant category codes for one issuer system and their corresponding merchant category code mappings to another issuer system. For example, when the proxy card system receives the proxy card payment request from the merchant system, the proxy card system dynamically maps the received MCC to the appropriate merchant category code for the payment instrument issuer. The proxy card system then inserts the appropriate merchant category code for the particular payment instrument issuer into the second payment request. This embodiment is suitable for any payment instrument system that uses its own category codes instead of the standard merchant category codes.

The functionality of the example embodiments will be explained in more detail in the following description, read in conjunction with the figures illustrating the program flow.

Example System Architectures

Turning now to the drawings, in which like numerals represent like (but not necessarily identical) elements throughout the figures, example embodiments are described in detail.

FIG. 1 is a block diagram depicting a system for transmitting merchant category codes to a payment instrument, in accordance with certain example embodiments. As depicted in FIG. 1, the system 100 includes network devices 110, 130, 140, and 170 that are configured to communicate with one another via one or more networks 105.

Each network 105 includes a wired or wireless telecommunication means by which network devices (including devices 110, 130, 140 and 170) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 110, 130, 140 and 170 includes a device having a communication module capable of transmitting and receiving data over the network 105. For example, each network device 110, 130, 140 and 170 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 130, 140 and 170 are operated by end-users or consumers, merchant operators, proxy card system operators, and payment instrument system operators, respectively.

The user 101 can use the communication application 112, such as a web browser application or a stand-alone application, to view, download, upload, or otherwise access documents or web pages via a distributed network 105. The network 105 includes a wired or wireless telecommunication system or device by which network devices (including devices 110, 130, 140 and 170) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The communication application 112 can interact with web servers or other computing devices connected to the network 105, including the point of sale terminal 134 of the merchant system 130, the merchant server 135 of the merchant system 130, and the web server 141 of the proxy card system 140.

The user network device 110 may include a digital wallet application module 111. The digital wallet application module 111 may encompass any application, hardware, software, or process the user device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user device 110 can include a proxy card application 115. The proxy card application 115 can interact with the communication application 112 or be embodied as a companion application of the communication application 112 and execute within the communication application 112. The proxy card application 115 may further be embodied as a companion application of the digital wallet application module 111 and execute within the digital wallet application module 111. The proxy card application 115 may employ a software interface for configuration that may open in the digital wallet application module 111 or may open in the web browser application 112. Alternatively, the proxy card application 115 may be execute on the user device 110 independent of the digital wallet application module 111 and the communication application 112.

The proxy card application 115 is operable to allow a user 101 to configure a proxy card account on the user device 110 and the proxy card system 140. The proxy card application 115 can allow the user 101 to set rules, confirm transactions, select preferred cards for a transaction, receive notice of a card selection, and provide other suitable services.

The user device 110 also includes a data storage unit 113 accessible by the digital wallet application module 111, the proxy card application 115, and the communication application 112. The example data storage unit 113 can include one or more tangible computer-readable storage devices. The data storage unit 113 can be stored on the user device 110 or can be logically coupled to the user device 110. For example, the data storage unit 113 can include on-board flash memory and/or one or more removable memory cards or removable flash memory.

In an example embodiment, the proxy card looks and/or functions in the same manner as a standard credit or debit card. For example, the proxy card may have the user's 101 name and/or account number listed on the front of the card. An example proxy card can include a magnetic stripe encoding the proxy card system 140 account information of the user 101. In an example embodiment, the account information encoded in the magnetic stripe routes payment requests to the proxy card system 140 for processing.

In an alternative example embodiment, the proxy card is not a physical card. Instead, the proxy card is an account accessible by a wireless tap of a user device 110, an account identification number, a bar code or QR code, a token, or other form of account identification or access, which may be entered manually into the term POS terminal 134 or which may be captured by the POS terminal 134. The proxy card as discussed throughout the specification refers to a physical card as well as the proxy account.

The user 101 may use the user device 110 or other network device to register the proxy card and/or access the proxy card system account of the user 101. The user device 110 may comprise appropriate technology that includes or is coupled to a web server (for example, Google Chrome, Microsoft Internet Explorer, Netscape, Safari, Firefox, or other suitable application for interacting with web page files).

The proxy card system 140 includes a data storage unit 147 accessible by the web server 141. The example data storage unit 147 can include one or more tangible computer-readable storage devices.

The user 101 can use a web server 141 on the proxy card system 140 to view, register, download, upload, or otherwise access the proxy card system 140 via a website (not illustrated) and a communication network 105). The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101. The proxy card system 140 also may function as the issuer for the associated financial payment instrument. The user's 101 registration information is saved in the proxy card system's 140 data storage unit 147 and is accessible the by web server 141. The user 101 also may use the web server 141 to define payment rules.

The merchant system 130 may use a web server 135 to view, download, upload, create offers, sell products online, or otherwise access the proxy card system 140 via a website 136 and a communication network 105. The merchant system 130 represents an entity that offers products for the user 101 to purchase or use. The merchant system 130 includes a point of sale ("POS") terminal 134. The POS terminal 134 may be operated by a salesperson that enters the purchase data into the POS terminal 134 to complete the purchase transaction. The merchant system 130 may be a physical store or an online merchant.

The user 101 may request a purchase from the merchant system 130. In an example embodiment, the purchase is initiated by a wireless "tap" of the mobile device 110 with the POS terminal 134. In an alternative example embodiment, the purchase is initiated when the user 101 enters an account identification number at the POS terminal 134 or in the mobile device 110. In another alternative example embodiment, the purchase is initiated online with the merchant server 135. The purchase may be initiated via the merchant website 136. In yet another alternative example embodiment, the purchase is initiated by use of a permanent/temporary virtual/physical token, QR code, bar code, or other suitable machine-readable medium captured by POS terminal 134. The merchant's POS terminal 134. interacts with an acquirer, the card network, the proxy card system 140, and the issuer.

The payment instrument system 170 represents any the system that issues or maintains a financial account that the can be associated with the proxy card system 140. Examples of the financial accounts that can be associated include, but are not limited to, debit cards, credit cards, stored value cards, loyalty/rewards cards, bank accounts, peer-to-peer transaction accounts, stored value accounts, and coupons (including purchased offers and other offers). The payment instrument system 170 can communicate with the proxy card system 140, the merchant system 130, and the user device 110 as needed to configure accounts, associate payment instruments, supply instrument art, or perform any other suitable functions.

The payment instrument system 170 includes a data storage unit 177 accessible by the web server 171. The example data storage unit 177 can include one or more tangible computer-readable storage devices.

The user 101 and others can use a web server 171 on the payment instrument system 170 to view, register, download, upload, or otherwise access the payment instrument system 170 via a website (not illustrated) and a communication network 105).

EXAMPLE PROCESSES

The components of the example operating environment 100 are described hereinafter with reference to the example methods illustrated in FIGS. 2-4.

Figure 2:
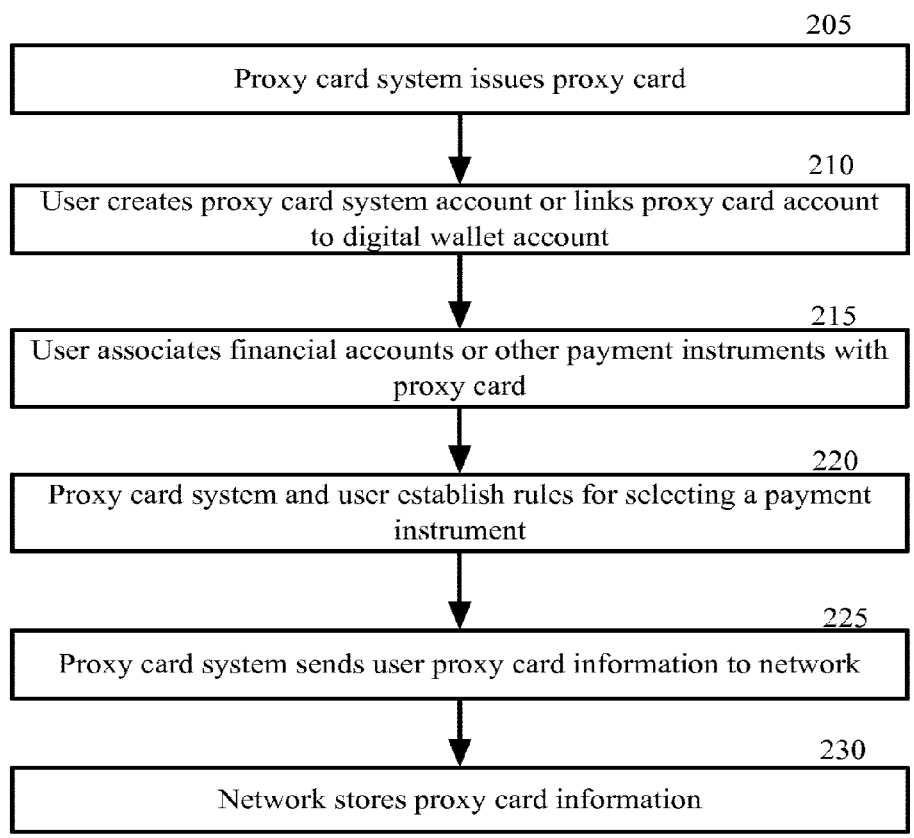
FIG. 2 is a block flow diagram depicting a method to register a user proxy card, in accordance with certain example embodiments.

FIG. 2 is a block flow diagram depicting a method 200 to register a user proxy card, in accordance with certain example embodiments.

With reference to FIGS. 1 and 2, in block 205, the proxy card system 140 issues a proxy card account to the user 101. In an example embodiment, the user 101 requests a proxy card using a web server 141, and the proxy card is mailed to the user 101. The user 101 may be issued an account number to be used for transactions via the Internet before or after a physical card is received. In an alternative example embodiment, the proxy card system 140 mails an inactivated proxy card to the user 101. The proxy card is then activated by the user 101 before use. In an alternative example embodiment, a physical proxy card is not issued. The proxy card account information can be stored in the user device 110 and is used to make a payment via a NFC, Bluetooth, Wi-Fi, or other form of wireless tap of the user device 110 with the point of sale ("POS") terminal 134. In an alternative example embodiment, the purchase is initiated when the user 101 enters an account identification number at the POS terminal 134 or in the user device 110. The account identification number may be the proxy card account number or a different number that links the payment transaction to the proxy card account. In yet another alternative example embodiment, a purchase is initiated by use of a permanent/temporary virtual/physical token QR code, bar code, or other suitable machine-readable medium that is read by the POS terminal 134. In these cases, the POS terminal 134 may comprise a scanner, camera, or other reading device that captures the proxy account information, such as a bar code or QR reader or other suitable reading device. The proxy account information may be printed in paper or other form.

In block 210, the user 101 creates a new proxy card system 140 account or links the proxy card to an existing account on the proxy card system 140. The proxy card system 140 also may create or update an account on a proxy card application 115 on the user device 110 or on a digital wallet application module 111 on the user device 110.

In block 215, the user 101 activates the proxy card and associates one or more financial instrument accounts (for example, debit cards, credit cards, gift cards/stored value cards, loyalty cards/reward cards, peer-to-peer payment accounts, coupons, prepaid or other offers, and other accounts used to make a purchase or redeem value added services) with the proxy card account. In an example embodiment, the user 101 associates multiple financial instrument accounts with the proxy card account. The user 101 may perform this block by inputting identifying information for each financial payment instrument account.

In an example embodiment, one or more financial instrument account(s) are maintained by the proxy card system 140 and other payment instrument systems 170. In an alternative example embodiment, the proxy card system 140 maintains one or more of the financial instrument accounts and acts as the issuer for that financial instrument account. In another example embodiment, the financial instrument accounts are maintained by more than one payment instrument systems 170, including the proxy card system 140.

In block 220, the user 101 establishes rules for selecting a payment instrument in a transaction. The user 101 can use the proxy card application 115 on the user device 110, a website on the web server 141 of the proxy card system 140, or any suitable hardware or software applications to establish rules. The user 101 can select from a selection of rules supplied by the proxy card system 140 or the user 101 can input new rules.

Additionally or alternatively, the proxy card system 140 can establish rules for selecting a payment instrument in a transaction and make recommendations to the user 101. For example, the proxy card system 140 can establish default payment instruments, make recommendations based on the rules of other users, make a recommendation based on payment instrument benefits or fees, or establish any other suitable rule or recommendation.

In an example of a rule that can be established by the proxy card system 140 or by the user 101, a particular payment instrument may be designated as the payment instrument to be selected for an identified merchant category codes ("MCC") or a group of codes. In another example, a payment instrument may be designated as the payment instrument to be selected for an identified merchant. In another example, proxy card system 140 may be directed to select the payment instrument with the lowest balance or the most available credit. Any other suitable rule can be established to select a payment instrument for a proposed transaction.

In another example of a rule that can be established by the proxy card system 140 or by the user 101, a particular payment instrument may be designated as the payment instrument for all transactions. Thus, the proxy card system 140 has predetermined the identified card before the transaction occurs and does not require transaction details for card selection. In an alternate example embodiment, the particular payment instrument may be designated as the default payment instrument for all transactions that do not trigger any other rule for card selection. That is, if no rule conditions are met for a particular transaction, then the default payment instrument is employed.

In another example, the user 101 can configure the proxy card account such that the user 101 must select the payment instrument for each transaction at the time of the transaction. The user 101 can select from a list of payment instruments or in any suitable manner indicate the preferred instrument for the transaction.

In block 225, the proxy card system 140 sends the user proxy card account identification information to the card network (not shown). The POS terminal 134 can identify the account number as belonging to a proxy card account on the proxy card system 140. Alternatively, the identification of the proxy card and the proxy card system 140 can occur at any place in the system of merchant system 130, acquirer, card network, or payment instrument system 170.

In block 230, the card network stores the proxy card account identification information. In an alternative example embodiment, the account number identifies the proxy card system 140 as the issuer and payments are automatically routed from the card network to the proxy card system 140 for approval.

In some embodiments, the proxy card account can be configured through any other process. For example, the proxy card may be hidden from the user 101. The user 101 may configure an account with the proxy card system 140 and have a proxy card automatically installed on the account for use with the user device 110 or other device. The account may be linked to a financial account or other account of the user 101. The user 101 may choose one financial account to be the active account and the selected financial account can become the backing instrument for the proxy card.

In another example, the method 200 can perform block 210 after blocks 220 and 230 are performed. That is, the user 101 can create a proxy card system 140 account and associate one or more financial accounts with the proxy card system 140 account. The proxy card system 140 may then issue a proxy card and associate the proxy card with the account of the user 101.

Figure 3:
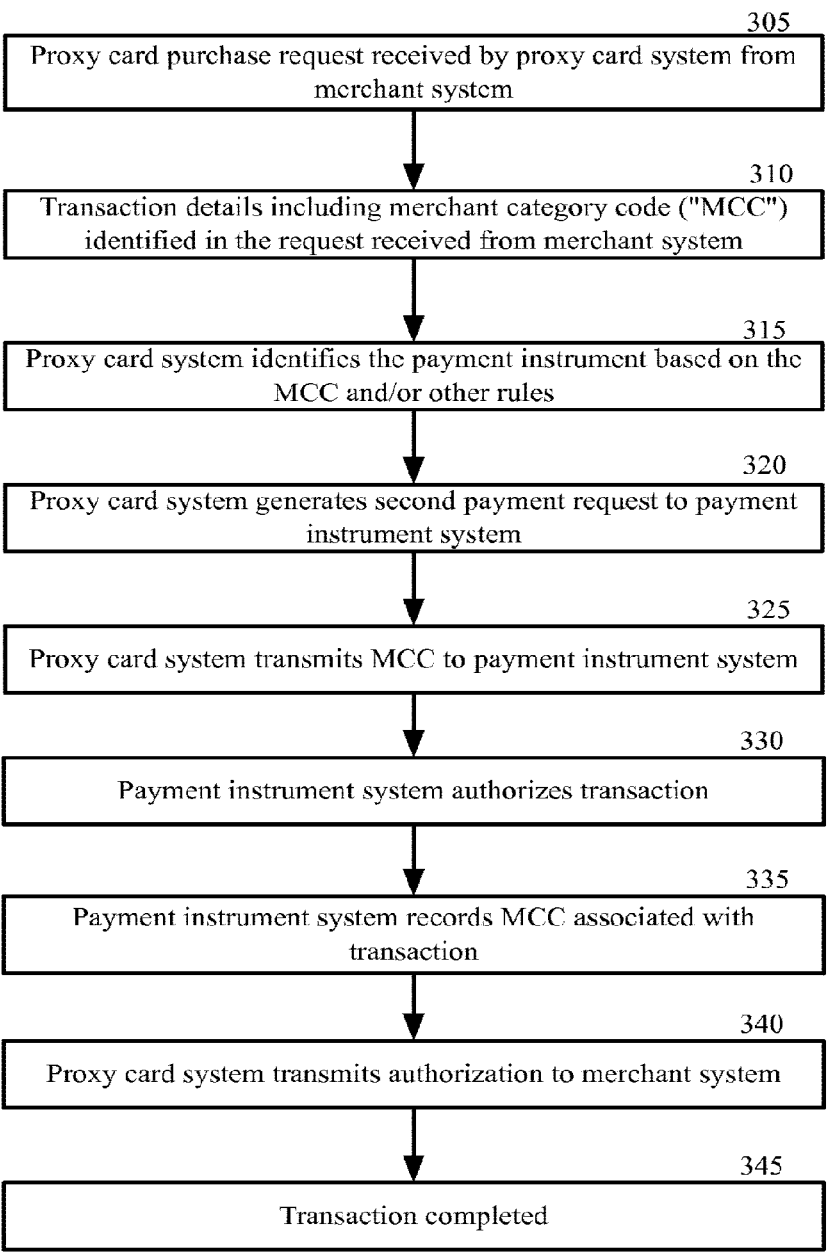
FIG. 3 is a block flow diagram depicting a method for transmitting merchant category codes to a payment instrument, in accordance with certain example embodiments.

FIG. 3 is a block flow diagram depicting a method 300 for transmitting a merchant category code ("MCC") to a payment instrument, in accordance with certain example embodiments.

In block 305, a proxy card purchase request is received by the proxy card system 140. The proxy card is used to conduct a transaction with a merchant system 130. The merchant system 130 can be at a physical merchant location or an online merchant store. The user 101 can select one or more products for purchase and initiate a transaction with the proxy card. As previously described, the initiation can be via a physical proxy card, contactless transaction with a user device, or an online transaction.

In block 310, the proxy card system 140 identifies the MCC in the transaction details in the transaction request from the merchant system 130. Throughout the specification, "MCC" refers to the merchant category code system currently being used by various credit card networks and also any other merchant category identifiers that may be employed. Additionally or alternatively, the MCC may be transmitted separate from the transaction request. Additionally or alternatively, the MCC may be obtained from another source other than the merchant system 130, such as the user device 110, a third party server, or other suitable entity.

In block 315, the proxy card system 140 identifies the payment instrument to use based on the MCC or other rules. Any rule established by the user or the proxy card system 140 can dictate the payment instrument to be used. Alternatively, the user 101 selects the payment instrument for use in the transaction. The user 101 can make a selection by actuating a physical or virtual button, by a voice command, by tapping the appropriate representation of the payment instrument, or by any other suitable manner of selecting an instrument. After a selection is made by the user 101, the selected payment instrument can be displayed on the user device 110.

In an alternate example embodiment, the proxy card system 115 can conduct the transaction without the selection of a payment instrument. At a time after the transaction is conducted, or at any time during the transaction, the payment instrument can be selected. The selection can be based on a set of rules as described above or can be made by the user 101 of the proxy card system 140.

In an alternate example embodiment, the user 101 selects a default payment instrument to be used for all transactions. The default payment instrument will be used until the user 101 selects a different default card.

In block 320, the proxy card system 140 creates a second payment request and forwards the request to the payment instrument system 170 that issued the payment instrument designated as the backing instrument for the transaction. In conventional systems, since the second payment request differs from the initial proxy card payment request, the MCC or category code is not included in the request.

In block 325, the proxy card system 140 transmits the MCC to the payment instrument system 170. The MCC can be transmitted as part of the second payment request or transmitted in conjunction with the second payment request. Additionally or alternatively, the MCC can be transmitted separately. The separate MCC transmission can be at the same time as the payment request or at a different time.

The second payment request and/or a separate MCC transmission can be communicated from the proxy card system 140 via an Internet connection over the network 105, email, instant message, or via any suitable communication technology.

In block 330, the payment instrument system 170 authorizes the transaction. The payment instrument system 170 can employ the same authorization methodology that is employed on a standard transaction using the payment instrument. For example, if the payment instrument is a credit card, the payment instrument system can determine if the credit card has available credit sufficient to fund the transaction, determine if the transaction appears to be non-fraudulent, and follow any other suitable steps for authorization. In another example, a stored value card can determine if sufficient funds are stored on the card to fund the transaction. Any other suitable authorization process can be employed. The payment instrument system 170 can transmit the authorization to the proxy card system 140.

In block 335, the payment instrument system 170 can record the MCC associated with the transaction. The payment instrument system 170 can associate the MCC and the transaction with the account of the user 101 to further characterize the transaction and use the characterization in the management of the account. For example, the payment instrument system 170 can use the MCC to award the appropriate reward points to the account. In another example, the payment instrument system 170 can use the MCC to associate the appropriate interest rate to the transaction. In another example, payment instrument system 170 can use the MCC to provide a spending analysis of the user 101.

In block 340, after receiving the authorization from the payment instrument system 170, the proxy card system 140 can authorize the transaction and transmit the authorization to the merchant system 130 through the card network system or through any other suitable system. If the payment instrument system 170 does not authorize the transaction, the proxy card system 140 can transmit a notice to the merchant system 130 that the transaction is declined. In an alternate embodiment, the proxy card system 140 can attempt the transaction with an alternate payment instrument.

In block 345, the transaction is completed at the merchant system 130. For example, after receiving the authorization from the proxy card system 140, the merchant system 130 can deliver the product or service to the user 101, provide a receipt to the user 101, receive a signature of the user 101, or perform any other suitable tasks to complete the transaction.

Figure 4:
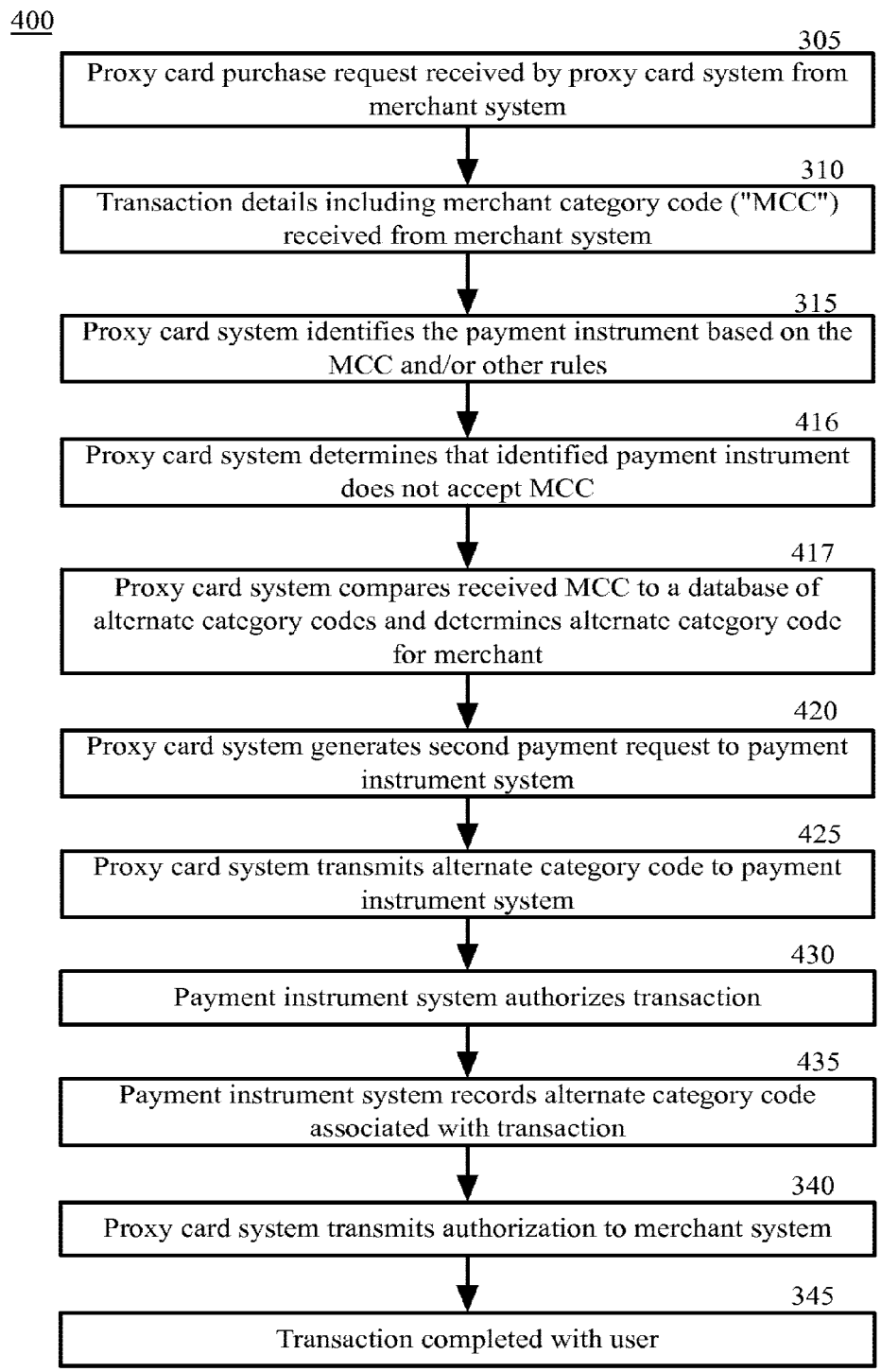
FIG. 4 is a block flow diagram depicting method for transmitting merchant category codes to a payment instrument with alternate merchant category codes, in accordance with certain example embodiments.

FIG. 4 is a block flow diagram depicting a method 400 for transmitting merchant category codes to a payment instrument with alternate merchant category codes, in accordance with certain example embodiments.

Blocks 305, 310, and 315 are similar to blocks 305, 310, and 315 as described with respect to FIG. 3 above.

In block 416, the proxy card system 140 determines that the payment instrument system 170 associated with the selected payment instrument does not accept the standard MCC system. Typically, a payment instrument system 170 that uses alternated category codes employs a category system that is personalized for the business model of the payment instrument system 170, is a legacy system of the payment instrument system 170, or is for any other reason different than the standard MCC system. The proxy card system 140 can maintain a list of the payment instrument systems 170 than employ alternative category codes.

In block 417, the proxy care system 140 compares the received MCC to a database of alternate category codes and determines an alternate category code for merchant system 130. The proxy care system 140 can maintain a database of category codes for cross-referencing with MCCs.

The database can additionally or alternatively maintain a description of each code and use transaction or product information to determine a category code. The database can additionally or alternatively maintain a category code for a list of merchant systems 130 and select the category code based on the identity of the merchant system 130. The database information can be generated, maintained, and updated by the proxy card system 140, by the merchant system 130, by the payment instrument system 170, or any suitable party.

American Express category codes are an example of an alternate category code system. When the proxy card system receives the proxy card payment request from the merchant system 130, the proxy card system 140 dynamically maps the merchant system to the appropriate American Express category code by looking up the merchant system and determining the correct American Express category code.

In block 420, the proxy card system 140 creates a second payment request and forwards the request to the payment instrument system 170 that issued the payment instrument designated as the backing instrument for the transaction. In conventional systems, since the second payment request differs from the initial proxy card payment request, the category code is not included in the request.

In block 425, the proxy card system 140 transmits the category code to the payment instrument system 170. The category code can be transmitted as part of the second payment request or transmitted in conjunction with the second payment request. Additionally or alternatively, the category code can be transmitted separately or at a different time. The separate category code transmission can be at the same time as the payment request or at a different time. The second payment request and/or a separate category code transmission can be communicated from the proxy card system 140 via an Internet connection over the network 105, email, instant message, or via any suitable communication technology.

In block 330, the payment instrument system 170 authorizes the transaction. The payment instrument system 170 can employ the same authorization methodology that is employed on a standard transaction using the payment instrument. For example, if the payment instrument is a credit card, the payment instrument system can determine if the credit card has available credit sufficient to fund the transaction, determine if the transaction appears to be non-fraudulent, and follow any other suitable steps for authorization. In another example, a stored value card can determine if sufficient funds are stored on the card to fund the transaction. Any other suitable authorization process can be employed. The payment instrument system 170 can transmit the authorization to the proxy card system 140.

In block 435, the payment instrument system 170 can record the category code associated with the transaction. The payment instrument system 170 can associate the category code and the transaction with the account of the user 101 to further characterize the transaction and use the characterization in the management of the account. For example, the payment instrument system 170 can use the category code to award the appropriate reward points to the account. In another example, the payment instrument system 170 can use the category code to associate the appropriate interest rate to the transaction. In another example, payment instrument system 170 can use the category code to provide a spending analysis of the user 101.

Blocks 340 and 345 are similar to blocks 340 and 345 as described with respect to FIG. 3 above.

OTHER EXAMPLE EMBODIMENTS

Figure 5:
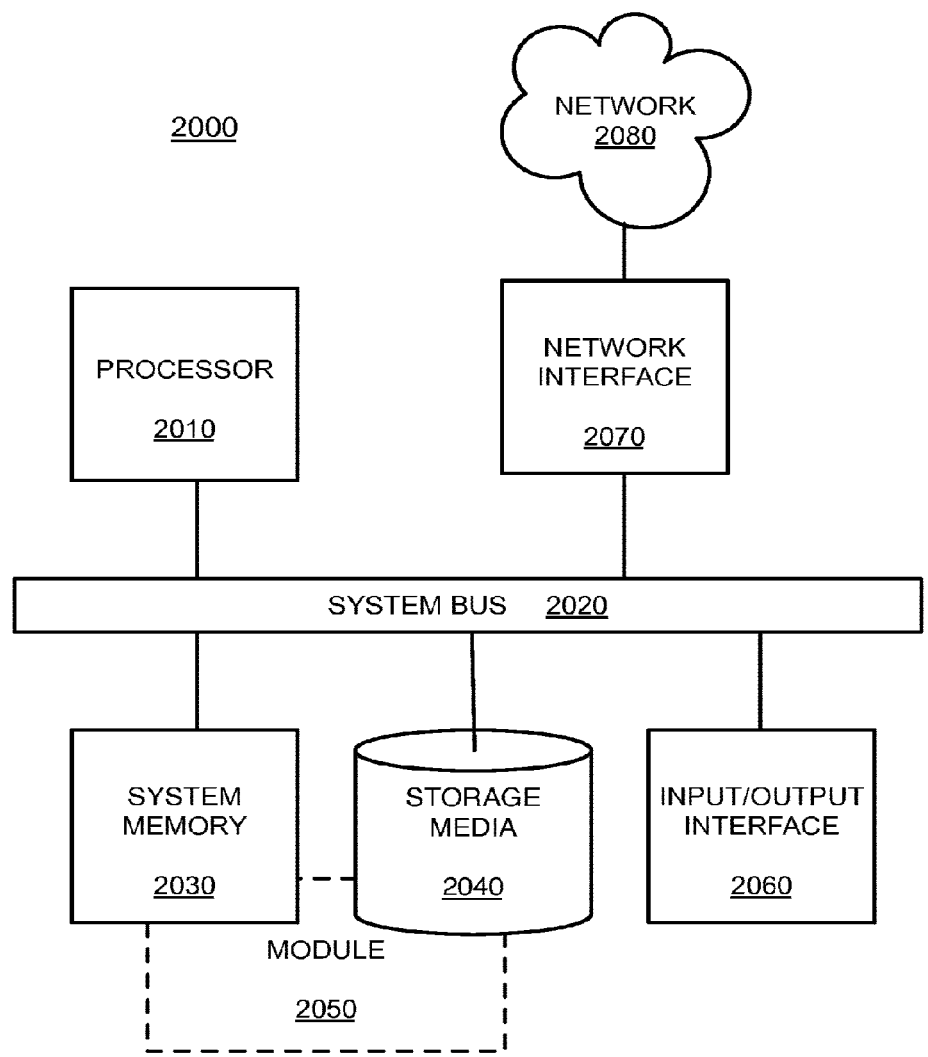
FIG. 5 is a block flow diagram depicting a computing machine and a module, in accordance with certain example embodiments.

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to transmit category codes to payment instrument issuers in proxy card transactions, comprising:
    receiving, using one or more computing devices and from a merchant computing device associated with a merchant, a first payment request to authorize a proxy card transaction, the first payment request identifying a proxy account of a user for payment of the transaction and a merchant category code associated with the merchant;
    selecting, using the one or more computer devices, a financial account associated with the proxy account to fund the transaction;
    communicating, using the one or more computing devices, a second payment request to authorize the transaction to a financial account system associated with the selected financial account;
    communicating, using the one or more computing devices, the merchant category code to the financial account system in a separate communication from the second payment request;
    receiving, using the one or more computing devices, a first authorization for the transaction from the financial account system to fund the transaction using the selected financial account; and
    communicating, using the one or more computing devices, a second authorization for the transaction to the merchant computing device in response to receiving the first authorization for the transaction from the financial account system to fund the transaction using the selected financial account.

2. The computer-implemented method of claim 1, wherein the one or more computing devices comprises the financial account system.

3. The computer-implemented method of claim 1, wherein the merchant category code is standardized code.

4. A computer program product, comprising:
a non-transitory computer-readable storage device having computer-readable program instructions embodied thereon that when executed by a computer perform a method to transmit category codes to payment instrument issuers in proxy card transactions, the computer-readable program instructions comprising:
  computer-readable program instructions to receive, from a merchant computing device associated with a merchant, a first payment request to authorize a proxy card transaction, the first payment request identifying a proxy account of a user for payment of the transaction and a merchant category code associated with the merchant;
  computer-readable program instructions to select a financial account associated with the proxy account to fund the transaction;
  computer-readable program instructions to communicate a second payment request to authorize the transaction to a financial account system associated with the selected financial account;
  computer program instructions to communicate the merchant category code to the financial account system in a separate communication from the second payment request;
  computer-readable program instructions to receive a first authorization for the transaction from the financial account system to fund the transaction using the selected financial account; and
  computer-readable program instructions to communicate a second authorization for the transaction to the merchant computing device in response to receiving the first authorization for the transaction from the financial account system to fund the transaction using the selected financial account.

5. The computer program product of claim 4, wherein the non-transitory computer-readable storage device comprises the financial account system.

6. The computer program product of claim 4, wherein the merchant category code is standardized code.

7. A system to transmit category codes to payment instrument issuers in proxy card transactions, comprising:
  a storage resource;
  a network module; and
  a processor communicatively coupled to the storage resource and the network module, wherein the processor executes application code instructions that are stored in the storage resource to cause the system to:
    receive from a merchant computing device associated with a merchant, a first payment request to authorize a proxy card transaction, the first payment request identifying a proxy account of a user for payment of the transaction and a merchant category code associated with the merchant;
    select a financial account associated with the proxy account to fund the transaction;
    communicate a second payment request to authorize the transaction to a financial account system associated with the selected financial account;
    communicate the merchant category code to the financial account system in a separate communication from the second payment request;
    receive a first authorization for the transaction from the financial account system to fund the transaction using the selected financial account; and
    communicate a second authorization for the transaction to the merchant computing device in response to receiving the first authorization for the transaction from the financial account system to fund the transaction using the selected financial account.

8. The system of claim 7, wherein the system comprises the financial account system.

9. The system of claim 7, wherein the merchant category code is standardized code.

* * * * *